United States Patent
Chang et al.

(10) Patent No.: US 10,816,056 B2
(45) Date of Patent: Oct. 27, 2020

(54) VIBRATION ISOLATION SYSTEM

(71) Applicant: Raytheon Company, Waltham, MA (US)

(72) Inventors: Eric E-Lee Chang, Dallas, TX (US); Emmanuel Fierro, Fairview, TX (US); Kirk A. Miller, Dallas, TX (US); Richard L. Scott, Allen, TX (US)

(73) Assignee: Raytheon Company, Waltham, MA (US)

( * ) Notice: Subject to any disclaimer, the term of this patent is extended or adjusted under 35 U.S.C. 154(b) by 148 days.

(21) Appl. No.: 15/825,594

(22) Filed: Nov. 29, 2017

(65) Prior Publication Data

US 2019/0162268 A1    May 30, 2019

(51) Int. Cl.
*F16F 1/02*       (2006.01)
*F16F 15/02*      (2006.01)
*F16F 15/04*      (2006.01)
*F16F 15/073*     (2006.01)
(Continued)

(52) U.S. Cl.
CPC ............ *F16F 15/022* (2013.01); *B64C 1/36* (2013.01); *B64D 47/08* (2013.01); *F16F 1/024* (2013.01); *F16F 15/04* (2013.01); *F16F 15/046* (2013.01); *F16F 15/073* (2013.01);
(Continued)

(58) Field of Classification Search
CPC combination set(s) only.
See application file for complete search history.

(56) References Cited

U.S. PATENT DOCUMENTS

| 3,063,670 A | 11/1962 | Young |
| 3,592,422 A * | 7/1971 | Paine ............... F16F 15/067 248/589 |
| 3,727,865 A | 4/1973 | Melrose et al. |
| (Continued) | | |

FOREIGN PATENT DOCUMENTS

| CN | 201834213 U | 5/2011 |
| WO | 2015/066508 A1 | 5/2015 |

OTHER PUBLICATIONS

Awtar et al., "An XYZ Parallel-Kinematic Flexure Mechanism With Geometrically Decoupled Degrees of Freedom", Journal of Mechanisms and Robotics, vol. 5, Feb. 2013, pp. 015001-1-015001-7.
(Continued)

*Primary Examiner* — Monica E Millner
(74) *Attorney, Agent, or Firm* — Renner, Otto, Boisselle & Sklar, LLP

(57) ABSTRACT

A vibration isolation device includes flexures and a multi-part mounting interface for coupling a frame that supports equipment to a structure. The flexures may include three pairs of flexures that allow movement in three orthogonal directions, to allow compliance and/or damp vibrations in the three directions. The flexures may surround the multi-part mounting interface, the parts of which are configured to move relative to one another. One of the parts of the mounting interfaces passes through another part of the mounting interface, such as in one or more holes in one of the interfaces. The device allows equipment mounted on the frame to be isolated from some or all of vibrations produced at the structure. In an example embodiment the vibration isolation system is used in mounting an optical sensor or device to an aircraft.

20 Claims, 9 Drawing Sheets

(51) Int. Cl.
*B64C 1/36* (2006.01)
*B64D 47/08* (2006.01)

(52) U.S. Cl.
CPC ..... *F16F 2230/105* (2013.01); *F16F 2230/34* (2013.01); *F16F 2236/02* (2013.01)

(56) References Cited

U.S. PATENT DOCUMENTS

| | | | |
|---|---|---|---|
| 4,208,087 A * | 6/1980 | Cooper | G02B 27/64 |
| | | | 359/557 |
| 5,030,876 A * | 7/1991 | EerNisse | H03H 9/0514 |
| | | | 310/353 |
| 5,310,157 A | 5/1994 | Platus | |
| 5,370,352 A * | 12/1994 | Platus | F16F 3/026 |
| | | | 248/619 |
| 6,131,461 A | 10/2000 | Leist | |
| 6,634,472 B1 * | 10/2003 | Davis | F16F 7/10 |
| | | | 188/378 |
| 8,635,938 B2 | 1/2014 | King et al. | |
| 9,057,425 B2 * | 6/2015 | Hendershott | F16H 21/04 |
| 9,261,155 B2 * | 2/2016 | Platus | F16F 15/04 |
| 9,348,197 B2 * | 5/2016 | Lewis | G03B 17/561 |
| 9,447,839 B2 * | 9/2016 | Dunning | F16F 15/073 |
| 9,739,354 B2 | 8/2017 | Hendershott | |
| 10,125,843 B2 * | 11/2018 | Runge | F16F 15/046 |
| 2002/0050167 A1 * | 5/2002 | Foote | F16F 15/02 |
| | | | 73/493 |
| 2003/0188941 A1 | 10/2003 | Davis et al. | |
| 2015/0176752 A1 | 6/2015 | Lewis | |

OTHER PUBLICATIONS

International Search Report and Written Opinion for corresponding International Application No. PCT/US2018/039272 dated Oct. 15, 2018.

* cited by examiner

VIBRATION ISOLATION SYSTEM

FIELD OF THE INVENTION

This disclosure relates generally to the field of vibration isolation systems, devices, and methods.

DESCRIPTION OF THE RELATED ART

Vibration isolation systems have used a variety of mechanisms to try and isolate a vibration source from equipment which could have its performance degraded by vibrations.

SUMMARY OF THE INVENTION

A vibration isolation system has pairs of parallel plate flexures, each pair of flexures allowing for compliance in a single translational direction.

A vibration isolation system has three pairs of parallel plate flexures oriented in different directions. The different directions may be orthogonal to one another.

A vibration isolation system has pairs of parallel plate flexures, with the flexures of each pair on opposed outer ends of the system.

A vibration isolation system has flexures configured to provide translational compliance, while maintaining rotational stiffness.

A vibration isolation system has parallel plate flexures surrounding mounting parts to which the flexures are mounted. The mounting parts include parts that move relative to one another.

According to an aspect of the invention, a vibration isolation system includes: a structure mount; an equipment mount; and flexures and a mounting interface for coupling together the equipment mount to the structure mount. The flexures include multiple pairs of flexures, with each of the pairs of flexures including parallel flexures on opposite respective sides of the mounting interface. The mounting interface includes multiple interface parts movable relative to one another.

According to an embodiment of any paragraph(s) of this summary, a portion of one of the interface parts passes through another of the interface parts.

According to an embodiment of any paragraph(s) of this summary, the interface parts include at least three interface parts.

According to an embodiment of any paragraph(s) of this summary, the pairs of flexures include three pairs of flexures, with the pairs of flexures oriented in different respective directions.

According to an embodiment of any paragraph(s) of this summary, the respective directions are orthogonal to one another.

According to an embodiment of any paragraph(s) of this summary, the flexures surround at least some of the interface parts.

According to an embodiment of any paragraph(s) of this summary, the flexures together form a parallelepiped shape that encloses the at least some of the interface parts.

According to an embodiment of any paragraph(s) of this summary, at least some of the interface parts act as stops to limit movement of the interface parts.

According to an embodiment of any paragraph(s) of this summary, the flexures include: a pair of vertical flexures that allow compliance in a vertical direction; a pair of longitudinal flexures that allow compliance in a longitudinal direction; and a pair of lateral flexures that allow compliance in a lateral direction.

According to an embodiment of any paragraph(s) of this summary, the interface parts include: a first interface part that includes a pair of first part side panels, and a pair of center beams that connect the side panels together; a second interface part that includes a pair of second part side panels, and a central span connecting the second part side panels; and a third interface part that is a frame that surrounds and defines an opening.

According to an embodiment of any paragraph(s) of this summary, the center beams pass through one or more holes in the central span.

According to an embodiment of any paragraph(s) of this summary, the first part side panels are vertical side panels.

According to an embodiment of any paragraph(s) of this summary, the central span has a trapezoidal shape, with the second side part panels being sloped side panels attached to edges of the central span.

According to an embodiment of any paragraph(s) of this summary, each of the pairs of flexures is attached to one or more of the interface parts.

According to an embodiment of any paragraph(s) of this summary, wherein one of the pairs of flexures is attached to either the structure mount or the equipment mount.

According to an embodiment of any paragraph(s) of this summary, the system further includes additional damping material attached to at least some of the flexures.

According to an embodiment of any paragraph(s) of this summary, the longitudinal flexures deform primarily by bending.

According to an embodiment of any paragraph(s) of this summary, the lateral flexures deform primarily by bending.

According to an embodiment of any paragraph(s) of this summary, the vertical flexures deform primarily by bending.

According to an embodiment of any paragraph(s) of this summary, the vertical flexures deform by being placed in tension.

According to another aspect of the system, a vibration isolation system includes: a structure mount; an equipment mount; and flexures and a mounting interface for coupling together the equipment mount to the structure mount. The flexures include multiple pairs of flexures. The mounting interface includes multiple interface parts movable relative to one another. A portion of one of the interface parts passes through another of the interface parts.

To the accomplishment of the foregoing and related ends, the invention comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF DRAWINGS

The annexed drawings, which are not necessarily to scale, show various aspects of the invention.

DETAILED DESCRIPTION

A vibration isolation device includes flexures and a multi-part mounting interface for coupling a frame that supports equipment to a structure. The flexures may include three pairs of flexures that allow movement in three orthogonal directions, to allow compliance and/or damp vibrations in the three directions. The flexures may surround the multi-part mounting interface, the parts of which are configured to move relative to one another. One of the parts of the mounting interfaces passes through another part of the mounting interface, such as in one or more holes in one of the interfaces. The device allows equipment mounted on the frame to be isolated from some or all of vibrations produced at the structure. In an example embodiment the vibration isolation system is used in mounting an optical sensor or device to an aircraft (for example).

Figure 1:
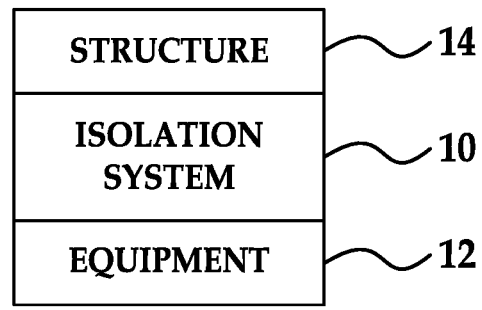
FIG. 1 is a schematic view of a vibration isolation system, according to an embodiment of the invention, coupling equipment to a structure.
Figure 3:
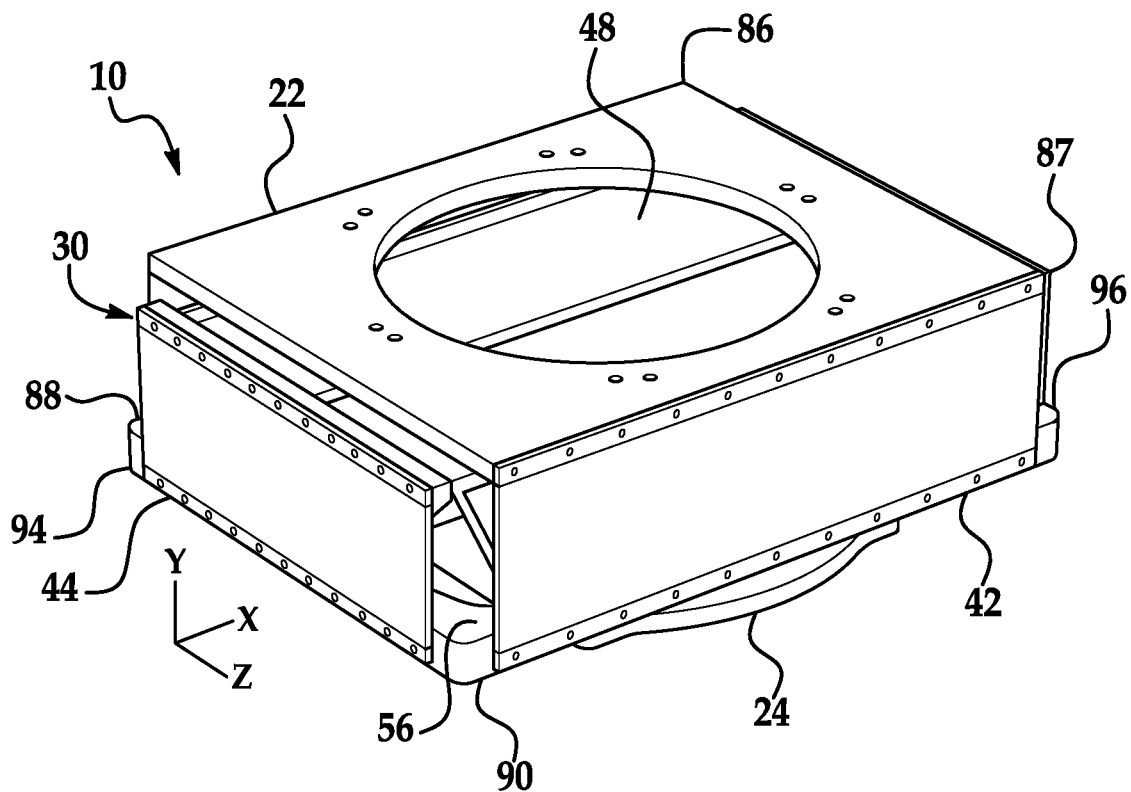
FIG. 3 is a first orthogonal view of the vibration isolation system of FIG. 1.
Figure 2:
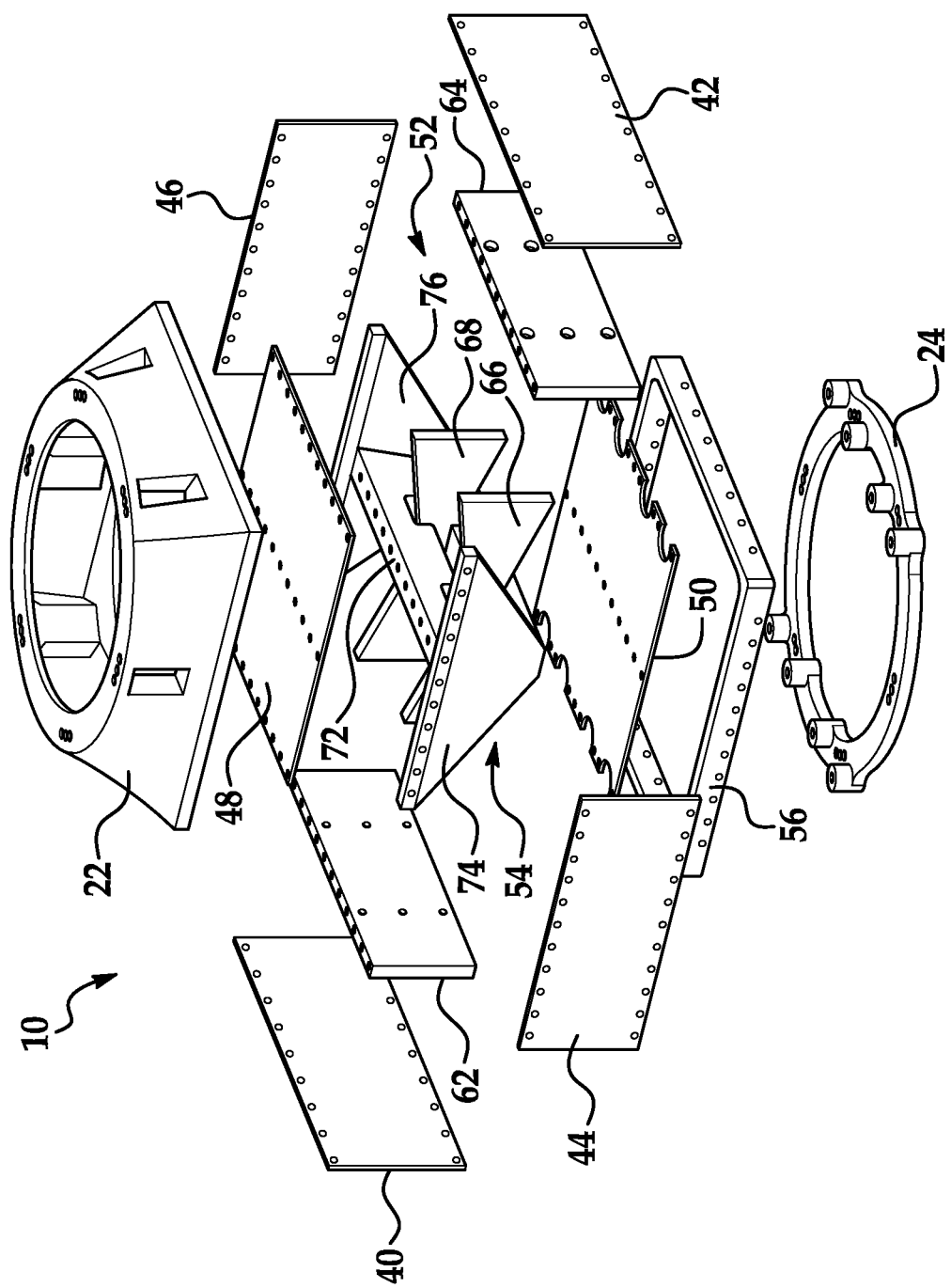
FIG. 2 is an exploded view of the system of FIG. 1.
Figure 4:
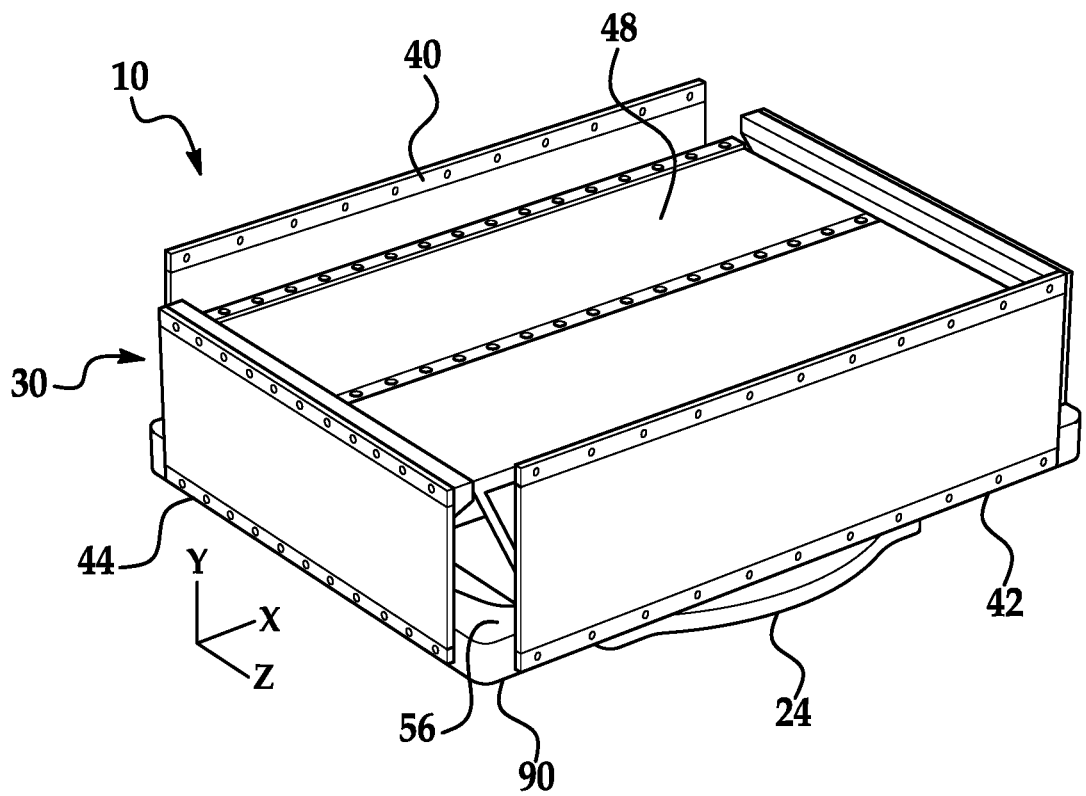
FIG. 4 is a second orthogonal view, showing parts of the vibration isolation system of FIG. 1.
Figure 5:
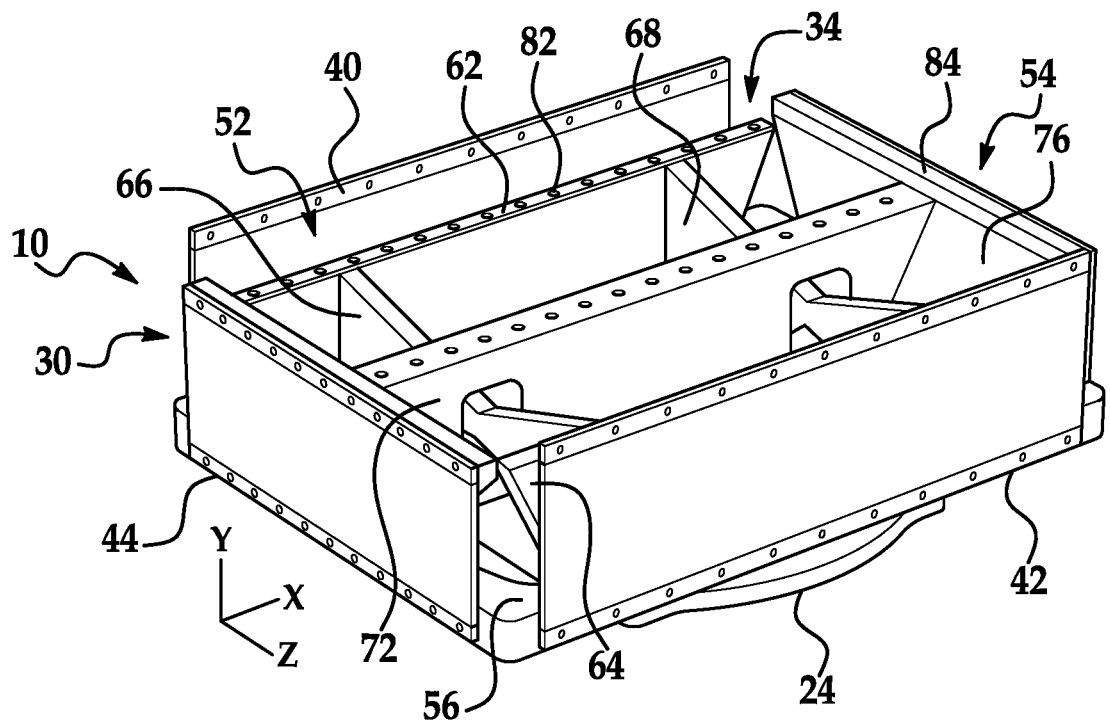
FIG. 5 is a third orthogonal view, showing parts of the vibration isolation system of FIG. 1.
Figure 6:
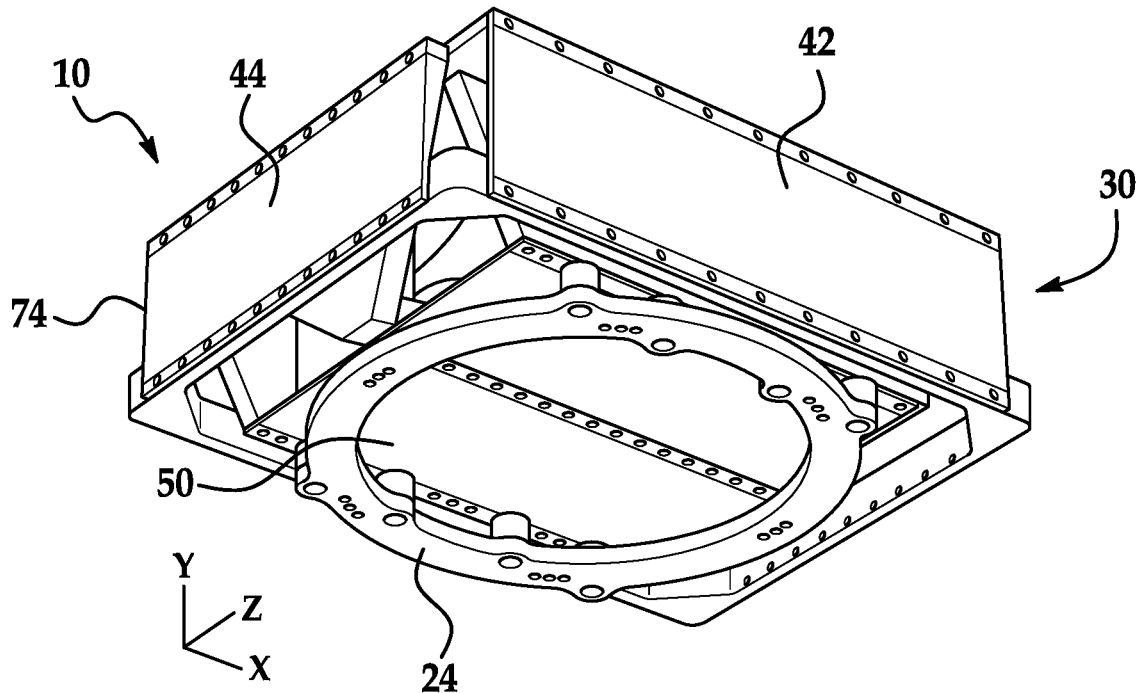
FIG. 6 is a fourth orthogonal view, showing parts of the vibration isolation system of FIG. 1.
Figure 7:
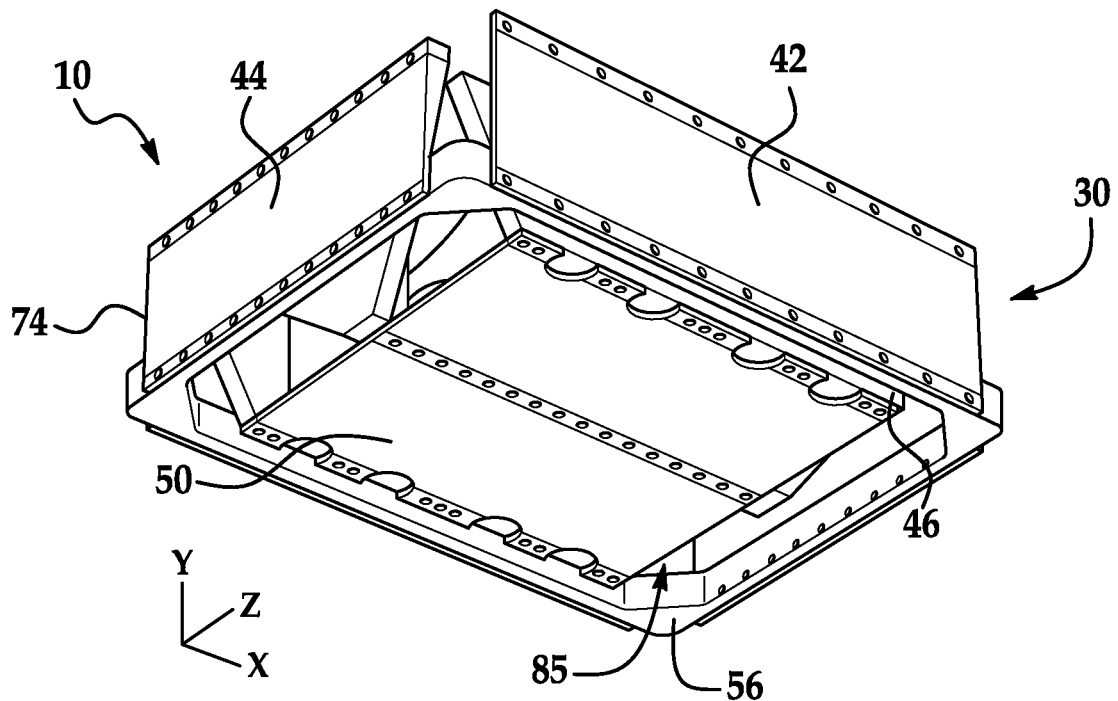
FIG. 7 is a fifth orthogonal view, showing parts of the vibration isolation system of FIG. 1.
Figure 8:
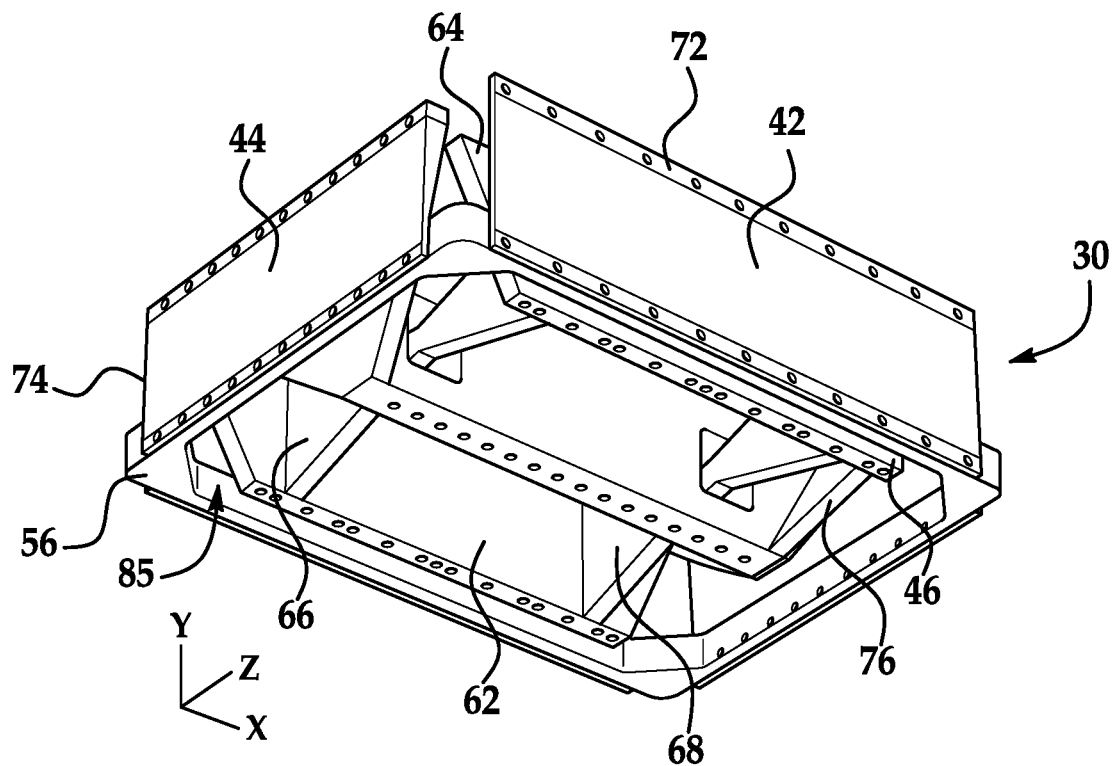
FIG. 8 is a sixth orthogonal view, showing parts of the vibration isolation system of FIG. 1.
Figure 9:
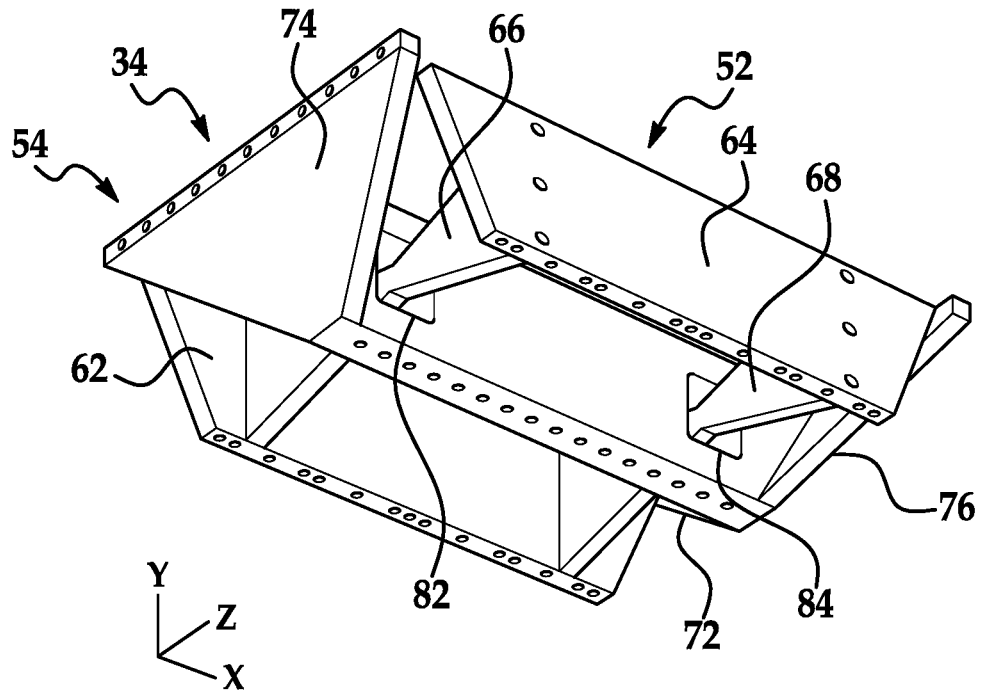
FIG. 9 is a seventh orthogonal view, showing parts of the vibration isolation system of FIG. 1.

FIG. 1 schematically shows a vibration isolation system 10 that is used to mount equipment 12, such as an optical sensor or device, to a structure 14, such as an aircraft. This is only one specific embodiment or use of the system 10, and it will be appreciated that vibration isolation systems such as described below may be used in any of a variety of situation, involving different types of equipment, different types of structures that the equipment is to be mounted on, and damping and/or isolating vibration from any of a variety of sources of vibration.

FIGS. 2-9 show further details of the vibration isolation system 10. The system 10 has a structure mount 22 for mounting to an aircraft structure (or other structure), and an equipment mount 24 to which equipment (such as an optical sensor) is mounted. The vibration isolation system 10 provides some degree of vibration isolation between the structure mount 22 and the equipment mount 24, for any of a variety of purposes, such as to isolate the equipment from at least some vibrations in the structure.

The system 10 includes a series of flexures 30, and a multi-part mounting interface 34. In the illustrated embodiment the flexures 30 include three pairs of flexures, each pair providing isolation in one direction. The flexures 30 include lateral flexures 40 and 42 which provide compliance and/or vibration amelioration (or damping) in the lateral direction, longitudinal flexures 44 and 46 which provide compliance and/or vibration amelioration (or damping) in the longitudinal direction, and vertical flexures 48 and 50 which provide compliance and/or vibration amelioration (or damping) in the vertical direction. The flexures 30 together, in conjunction with the mounting interface 34, allow vibration isolation in all three orthogonal directions. Some or all of the flexures 30 may have additional damping material attached to them, for example by use of an adhesive to attach the additional damping material or by spray application of additional damping material. Suitable damping materials may include a thixotropic paste or a pressure sensitive adhesive, to give non-limiting examples. Alternatively or in addition, damping material may be applied to structural parts that are used to support the flexures.

The flexures 30 are each attached to interface parts of the mounting interface 34, and (in some cases) either to the structure mount 22. The mounting interface 34 includes three interface parts, a vertical mounting part (or sub-assembly) 52, a longitudinal flexure mounting part 54, and a frame 56. The vertical flexure mounting part 52 includes vertical side panels 62 and 64, and a pair of center beams 66 and 68 that connect the panels 62 and 64 together. The side panels 62 and 64 may be trapezoidal, longer at their tops than at their bottoms. The longitudinal flexure mounting part (or sub-assembly) 54 includes a central span 72 and a pair of sloped side panels 74 and 76 fixedly attached to opposite ends (edges) of the central span 72. The central span 72 has a trapezoidal shape, being longer at the top than at the bottom. The central span 72 thus has sloped side edges that are engaged by the side panels 74 and 76. The center beams 66 and 68 pass through holes 82 and 84 in the central span 72, to allow relative movement of mounting parts (or sub-assemblies) 52 and 54.

The frame 56 is an open rectangular part. Portions of the mounting parts 52 and 54 may be in an opening 85 that is surrounded by the frame 56. The equipment mount 24 is attached to bottom edges of the side panels 62 and 64 of the lateral mounting part 52.

The parts 52, 54, and 56 are linked by the various flexures 30 with each other and to the other parts of the system 10, in particular to the structure mount 22 and the equipment mount 24. Top ends of the lateral flexures 40 and 42 are attached to edges 86 and 87 on opposite side of the structure mount 22, and bottom ends of the lateral flexures are attached to the opposite edges 88 and 90 of the frame 56. These attachments, and the other attachments described below, may be made with rivets or other suitable fasteners, such as threaded fasteners such as screws or bolts, or alternatively by other suitable means, such as suitable adhesives or other means of adhering. The lateral flexures 40 and 42 are parallel to each other and on opposite sides of the system 10.

Tops of the longitudinal flexures 44 and 46 are attached at their top ends to the top ends of the sides of the sloped side panels 74 and 76. The bottom ends of the longitudinal flexures 44 and 46 are attached to opposite side edges 94 and 96 of the frame 56. The edges 88, 90, 94, and 96 extend around the frame 56, such that the flexures 40, 42, 44, and 46 surround the frame 56 as well.

The vertical flexures 48 and 50 are attached to the top and bottom edges of the central span 72 of the longitudinal mounting part 54, and the vertical side panels 62 and 64 of the lateral mounting part 52. The central parts of the flexures 48 and 50 attach to the central span 72, and the sides of the flexures 48 and 50 attach to the side panes 62 and 64. The equipment mount 24 also attaches to the bottom edges of the vertical side panels 62 and 64.

As noted earlier, each pair of the flexures 30 allows movement (compliance) and damps motion in a respective direction that is normal to the planes of the flexures. The different directions are orthogonal in the illustrated embodiment, but alternatively the different directions may be non-orthogonal. The flexure pairs each include a pair of parallel flexures, but alternatively there may be additional flexures and/or differently-configured flexures for each of the directions.

The flexures 30 are configured to surround the mounting parts 52 and 54, with the flexures 30 forming a parallelepiped box (with open corners) when the system 10 is in a rest condition. Such a configuration may have advantage of eliminating a translational degree of freedom.

The mounting parts (or sub-assemblies) 52, 54, and 56 are configured so as to allow relative movement between the parts (or sub-assemblies) 52, 54, and 56 (or relative to the structure mount 22), so as to allow compliance and/or damping by the pairs of the flexures 30. The frame 56 moves laterally relative to the structure mount 22, flexing the lateral flexures 40 and 42, thereby allowing compliance and/or damping of lateral movements. The longitudinal mounting part 54 moves longitudinally relative to the frame 56, flexing the longitudinal flexures 44 and 46, thereby allowing compliance and/or damping of longitudinal motions. The vertical mounting part 52 moves vertically relative to the longitudinal mounting part 54, flexing the vertical flexures 48 and 50, thereby allowing compliance and/or damping of vertical motions.

In addition the parts 52, 54, and/or 56 may be configured to act as stops, mechanically limiting the travel of other parts. The center beams 66 and 68 have bow tie shapes, with the narrowest parts located where the beams 66 and 68 pass through the holes 82 and 84 in the central span 72. The limit to the relative vertical displacement of the parts 52 and 54 may be provided by the difference between the height of the holes 82 and 84 and the height at the middle of the center beams 66 and 68. The slope of the edges of the beams 66 and 68 away from where the beams 66 and 68 pass through the holes 82 and 84 limits the relative tilt of the parts 52 and 54 along an axis passing through the centers of both of the beams 66 and 68 (and perpendicular to the major surfaces of the beams 66 and 68).

Alternatively, the limit to vertical travel may be contact between the parts 52 and 54, and the structure mount 22. And in addition (or alternatively), contact between the structure mount 22 and the side panels 62 and 64 may limit relative tilt of the parts 52 and 54 and the axis passing through the centers of both of the beams 66 and 68.

The sloped side panels 74 and 76 may also act as stops that limit longitudinal sway. Longitudinal movement of the parts 52 and 54 may be limited by collision of the side panels 74 and 76 with the longitudinal flexures 44 and 46, and/or with the frame 56.

Many other interactions of the various parts and flexures are usable as mechanical stops, depending on the configurations of the parts and flexures. There may be cushioning material (snubbing pads or material) placed where the parts are to come up against other parts. This cushioning material may serve the purpose of softening the impact forces between parts. Examples of suitable snubbing material or snubbers include rubber, resilient polymer foam, polyester films such as those sold under the trademark MYLAR, polyamide spherical contacts, and stiff helical metallic springs.

The components of the system 10 may be made of any of a variety of suitable materials, for example suitable metals. For example, the mounting parts, the frame, and the equipment and structure mounts may be made of aluminum. The flexures may be made of steel. The thickness of the various flexures may be selected to tune the isolator frequencies of the system. The isolator frequencies may be differently tuned for the different directions, or they may be tuned so as to provide the same frequency response (or a similar frequency response) in all of the directions.

Figure 10:
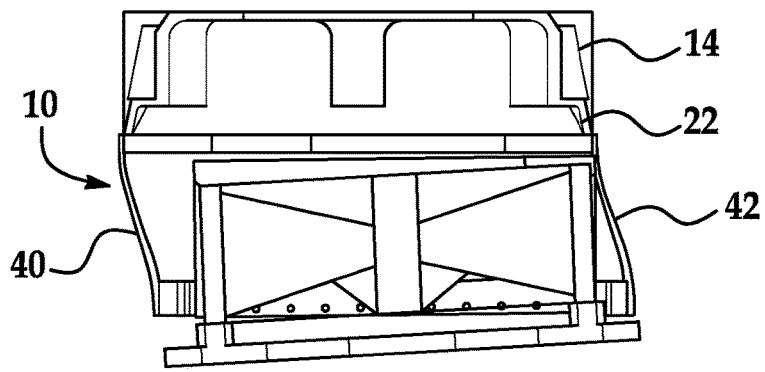
FIG. 10 is an end view of the vibration isolation system of FIG. 1, illustrating lateral sway.
Figure 11:
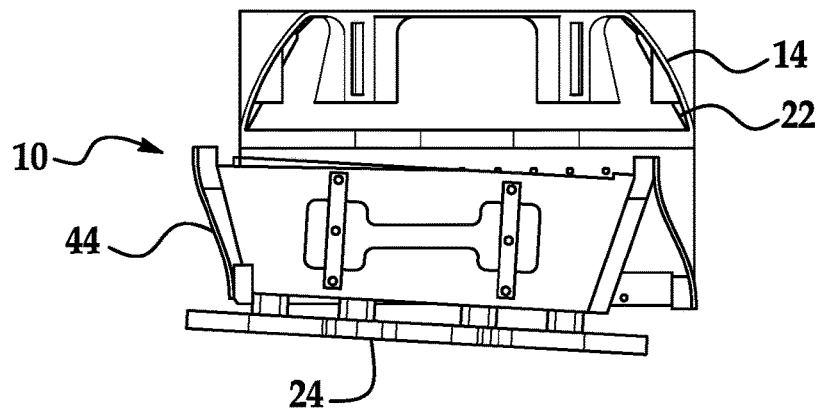
FIG. 11 is a side view of the vibration isolation system of FIG. 1, illustrating longitudinal sway.
Figure 12:
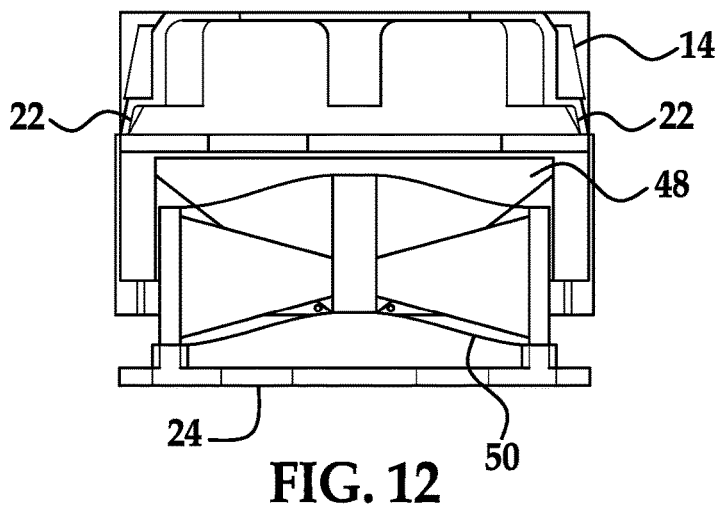
FIG. 12 is an end view of the vibration isolation system of FIG. 1, illustrating vertical sway.

FIGS. 10-12 illustrate movement of the system 10 in the three directions. FIG. 10 shows lateral sway from the bending of the lateral flexures 40 and 42. FIG. 11 shows longitudinal sway from the bending of the longitudinal flexures 44 and 46. FIG. 12 shows vertical sway from the bending of the vertical flexures 48 and 50.

The system 10 may be configured to handle frequencies of particular significance, for example resonate frequencies from the aircraft or other structure 12 (FIG. 1), or frequencies that can cause particular problems for the equipment, such as the optical sensor or device 14. In one example embodiment the system 10 may be configured to particularly ameliorate frequencies of around 10-12 Hz, but many other frequencies are possible to be best handled by the system 10.

The system 10 can be varied in size and/or configuration as necessary. The flexures 30 can be tuned, for example by changing material, thickness, shape, bend radius, and/or other parameters, so as to tune the system 10 to achieve the desired compliance and/or damping. The tuning by selection of bend radii may also be done to minimize stiffening of thin plates in tension, which may be of importance in some situations, such as with regard to the vertical flexures 48 and 50 in the illustrated embodiment. The tuning may be done for all of the flexures 30 or may be varied as desired to control performance in the individual translation directions corresponding to the various pairs of flexures.

The system 10 may achieve tunable translational compliance through bending of the flexures 30, while maintaining rotational stiffness. The vibration isolation is achieved through the pairs of the flexures 30, which act independently. The mounting parts 52, 54, and 56, link the equipment 12 (FIG. 1) to the structure 14 (FIG. 1) through the flexures 30. The parts 52, 54, and 56 are stiff, and allow some relative movement between the parts, allowing for independent translational movement in the directions corresponding to the pairs of the flexures 30, with each of the flexure pairs acting independently, and being independently tunable. Rotational rigidity (stiffness) is achieved through loads acting in the planes of the parallel flexures.

Figure 13:
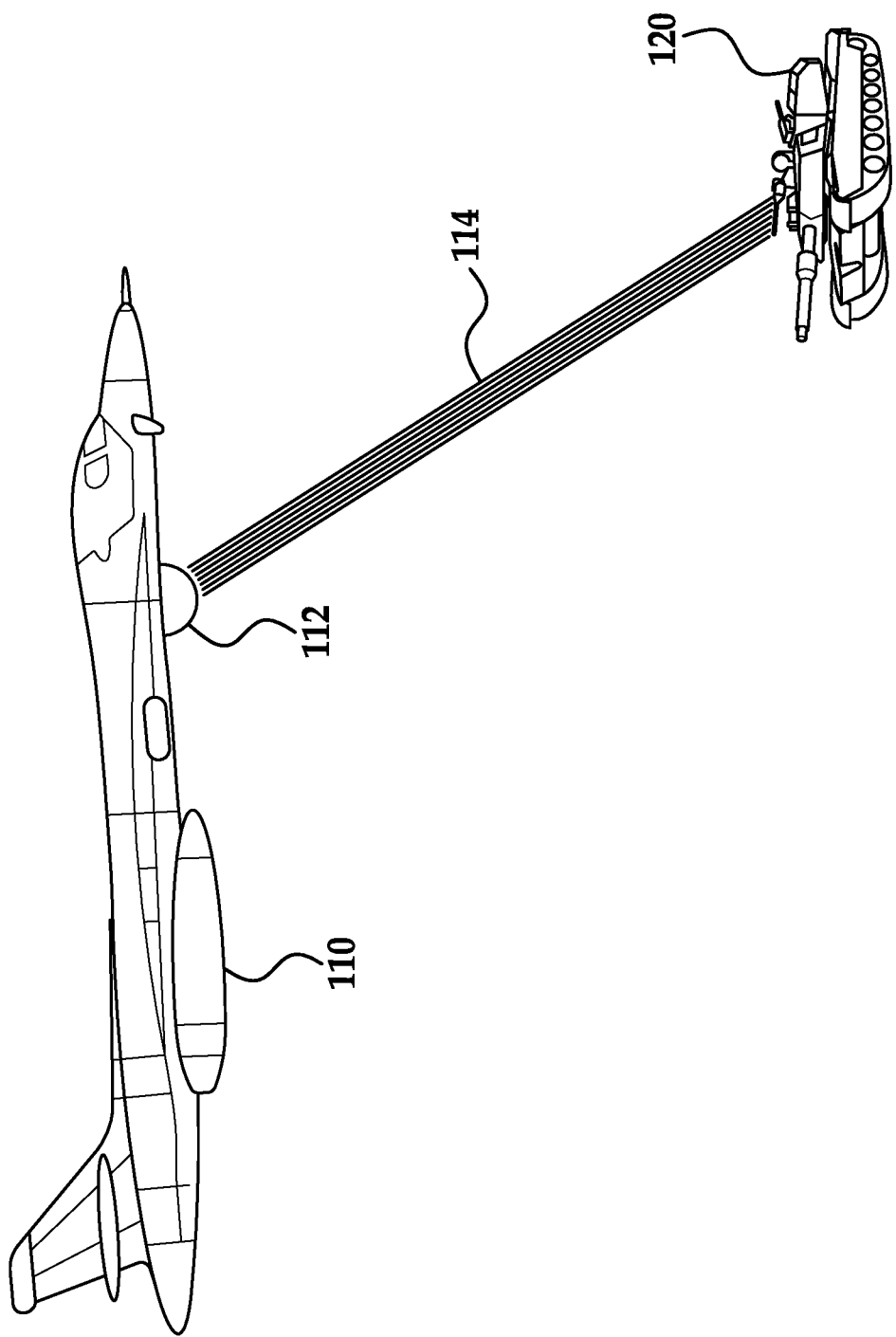
FIG. 13 is a schematic view of a prior art aircraft with a turret, one possible application for the vibration isolation system of FIG. 1.

The system 10 is useful for a variety of reasons, in a variety of circumstances. In one non-limiting embodiment that system 10 may be used for mounting a sensor, such as optical sensor, for example a sensor that is part of electro-optical/infrared (EO/IR) sensor module, in a turret. FIG. 13 shows an example of such a prior art rotary turret system 112 mounted on an aircraft 110, which directs a beam 114 at a target 120, with the turret rotatable in order to track the target 120 and/or damage/destroy the target 120. Further details regarding such a system may be found in co-owned U.S. Pat. No. 8,635,938, which is incorporated by reference in its entirety.

Random vibrations in such a system may degrade video resolution by exciting structural modes within the turret, causing image motion through displacements of optical elements. Isolating the turret, such as by use of the vibration isolation system 10 (FIG. 1), will reduce the vibration levels at frequencies that will excite these structural modes. The system 10 advantageously provides rotations stiffness, in contrast with other vibration isolation methods that are compliant in rotational degrees of freedom. Such compliance in rotational degrees of freedom is not desirable for gimbals that need mounting platforms with rotations stiffness, in order to act against. Such gimbals are not sensitive to translational compliance, so the translational compliance that the system 10 provides does not degrade performance.

It will be appreciated that vibration isolation systems such as the system 10 (FIG. 1) described above may be use in a wide variety of other situations. Examples of other such systems include a ground optical system that has a gimbal, as well as systems on ground vehicles, water vehicles, or space vehicles. Such systems may provide translational compliance and/or damping, combined with rotational stiffness, in situations where such performance would be desirable.

Figure 14:
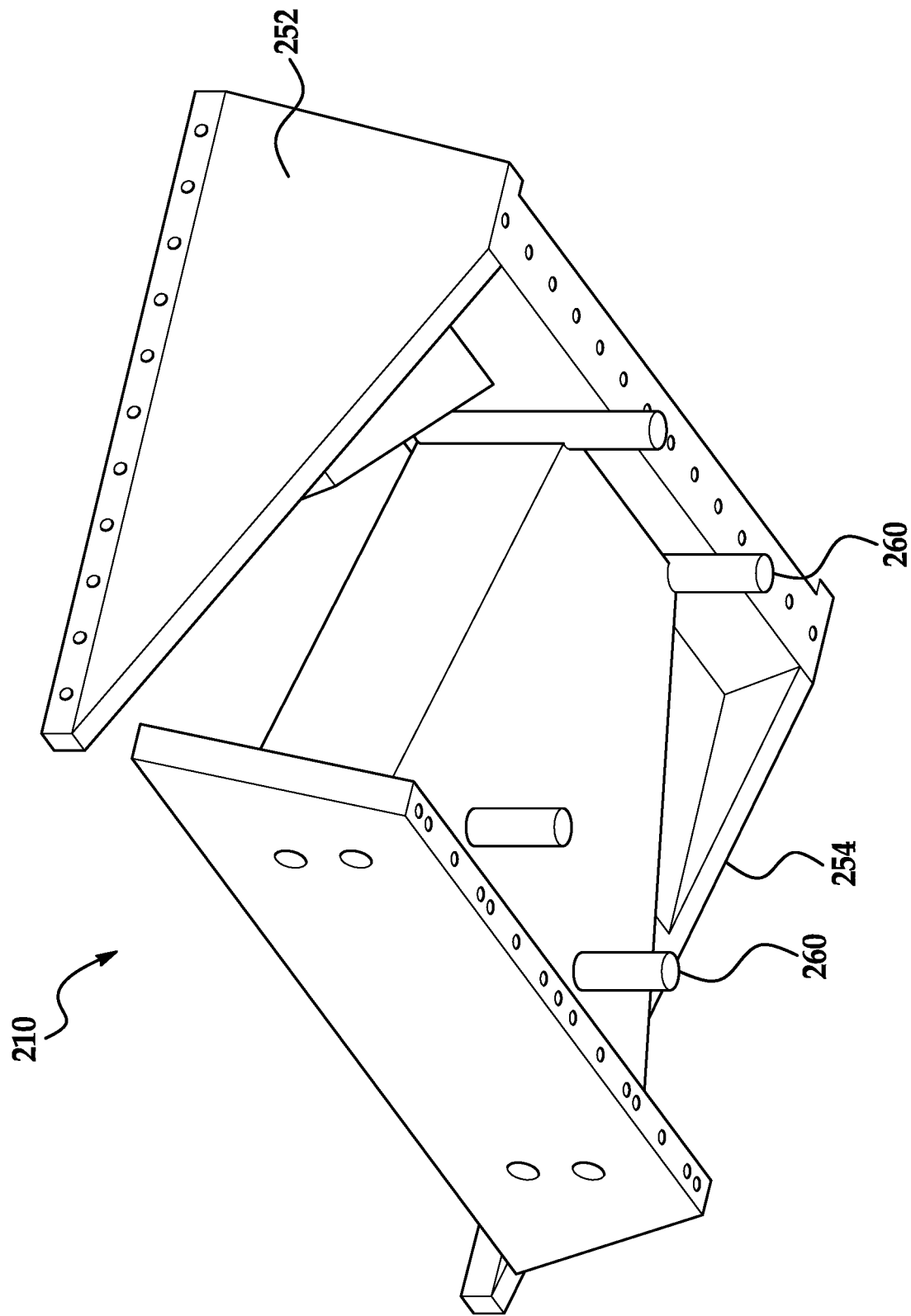
FIG. 14 is an orthogonal view of a pair of mounting parts that are part of a vibration isolation system that is an alternate embodiment of the invention.
Figure 15:
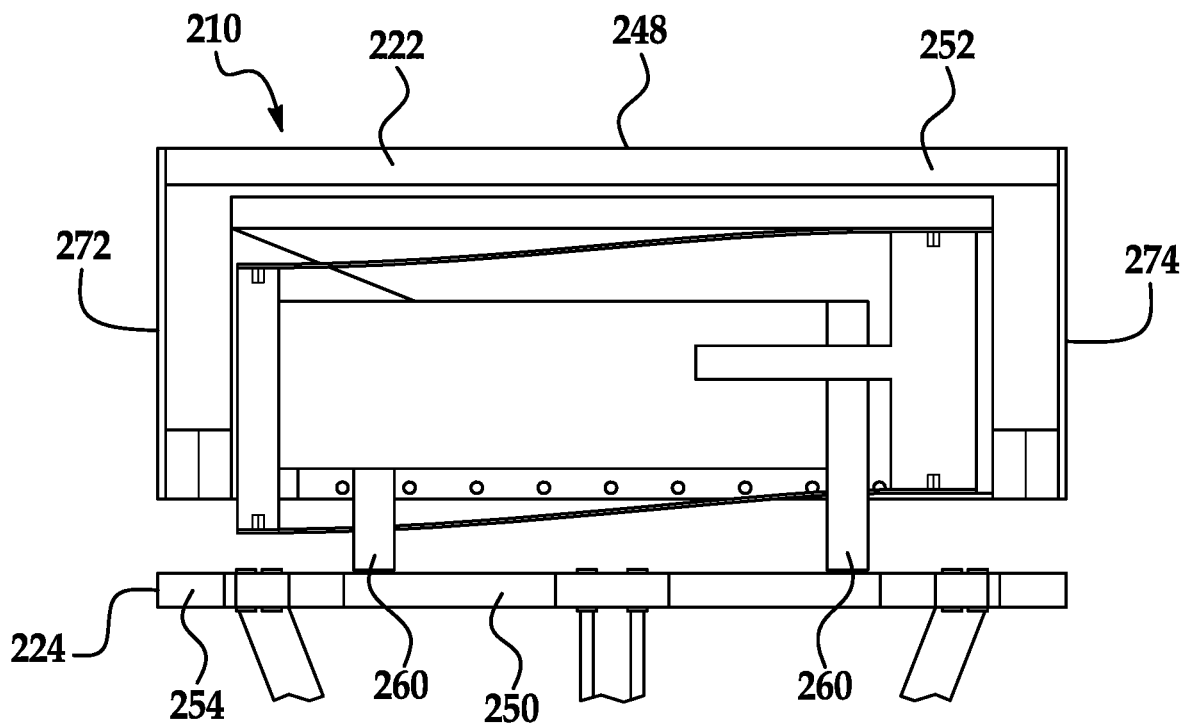
FIG. 15 is a cutaway side view of the alternate embodiment isolation system.
Figure 16:
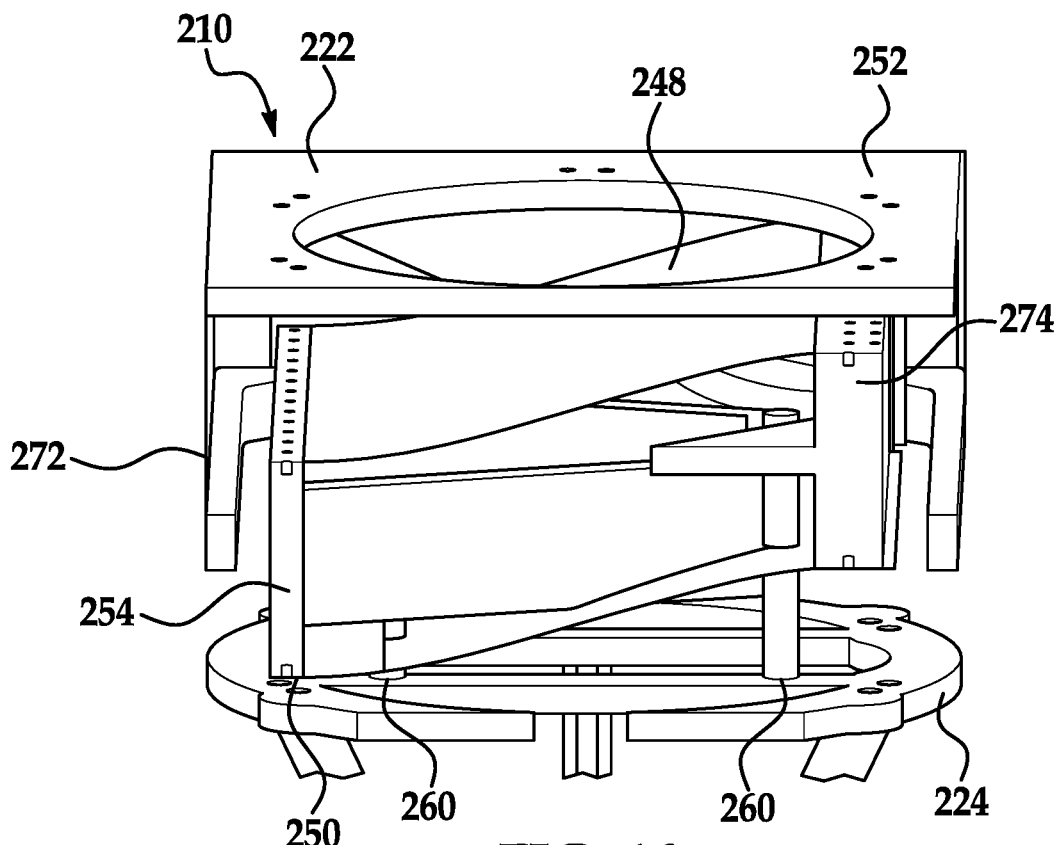
FIG. 16 is a cutaway orthogonal view of the alternate embodiment isolation system.

FIGS. 14-16 show parts of an alternative vibration isolation system 210 in which vertical flexures 248 and 250 are cantilevered flexures that act primarily by bending. The flexures 248 and 250 are coupled at one end to a first mounting part 252 that is fixed with regard to vertical movement, being fixed vertically relative to a structure mount 222. At the other end of the flexures 248 and 250 the flexures 248 and 250 are coupled to a second mounting part 254 that is fixed to an equipment mount 224. The second mounting part 254 may include posts 260 that make attachment to the equipment mount 224. The posts 260 may pass through holes (not shown) in the bottom flexures 250. A vertical force causes the second mounting part 252 to move relative to the first mounting part 254, which causes the flexures to bendingly deform, damping the movement. This bending is exaggerated for illustration purposes in FIG. 16—the actual deformation of the flexures 248 and 250 is less than what is shown.

The system 210 may have other flexures that damp movement in longitudinal and lateral directions, for example including flexures 272 and 274 each connected to both a frame 256 and the structure mount 222. The operation of the lateral and longitudinal damping may be similar to that in the system 10 (FIG. 1).

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A vibration isolation system comprising:
a structure mount;
an equipment mount; and
flexures and a mounting interface for coupling together the equipment mount to the structure mount;
wherein the flexures include multiple pairs of flexures, with each of the pairs of flexures including parallel flexures on opposite respective sides of the mounting interface;
wherein the mounting interface includes multiple interface parts movable relative to one another; and
wherein a portion of one of the interface parts passes through another of the interface parts, allowing relative movement between the one of the interface parts and the another of the interface parts, and without contact between the one of the interface parts and the another of the interface parts.

2. The system of claim 1, wherein the multiple interface parts include at least three interface parts.

3. A vibration isolation system comprising:
a structure mount;
an equipment mount; and
flexures and a mounting interface for coupling together the equipment mount to the structure mount;
wherein the flexures include multiple pairs of flexures, with each of the pairs of flexures including parallel flexures on opposite respective sides of the mounting interface;
wherein the mounting interface includes multiple interface parts movable relative to one another;
wherein the pairs of flexures include three pairs of flexures, with the pairs of flexures oriented in different respective orientation directions,
wherein the three pairs of flexures include:
a first pair of flexures that allow compliance in a first direction, the first direction being a direction from the structure mount to the equipment mount;
a second pair of flexures that allow compliance in a second direction that is different from the first direction; and
a third pair of flexures allow compliance in a third direction that is different from the first direction and the second direction.

4. The system of claim 3, wherein the respective orientation directions are orthogonal to one another.

5. The system of claim 1, wherein the multiple pairs of flexures surround at least some of the interface parts.

6. The system of claim 5, wherein the multiple pairs of flexures together form a parallelepiped shape that encloses the at least some of the interface parts.

7. The system of claim 3, wherein at least some of the interface parts act as stops to limit movement of the interface parts.

8. The system of claim 3, wherein the three pairs of flexures include:
a pair of vertical flexures that allow compliance in a vertical direction, which is the first direction;
a pair of longitudinal flexures that allow compliance in a longitudinal direction, which is the second direction; and
a pair of lateral flexures that allow compliance in a lateral direction, which is the third direction.

9. A vibration isolation system comprising:
a structure mount;

an equipment mount; and flexures and a mounting interface for coupling together the equipment mount to the structure mount;

wherein the flexures include multiple pairs of flexures, with each of the pairs of flexures including parallel flexures on opposite respective sides of the mounting interface;

wherein the mounting interface includes multiple interface parts movable relative to one another;

wherein the flexures include:
- a pair of vertical flexures that allow compliance in a vertical direction
- a pair of longitudinal flexures that allow compliance in a longitudinal direction; and
- a pair of lateral flexures that allow compliance in a lateral direction; and wherein the interface parts include:
- a first interface part that includes a pair of first part side panels, and a pair of center beams that connect the side panels together;
- a second interface part that includes a pair of second part side panels, and a central span connecting the second part side panels; and
- a third interface part that is a frame that surrounds and defines an opening.

10. The system of claim 9, wherein the center beams pass through one or more holes in the central span.

11. The system of claim 9, wherein the first part side panels are vertical side panels.

12. The system of claim 9, wherein the central span has a trapezoidal shape, with the second side part panels being sloped side panels attached to edges of the central span.

13. The system of claim 9, wherein each of the pairs of flexures is attached to one or more of the interface parts.

14. The system of claim 13, wherein one of the pairs of flexures is attached to either the structure mount or the equipment mount.

15. The system of claim 8, wherein the longitudinal flexures and the lateral flexures deform primarily by bending.

16. The system of claim 15, wherein the vertical flexures deform primarily by bending.

17. The system of claim 15, wherein the vertical flexures deform by being placed in tension.

18. The system of claim 3, further comprising additional damping material attached to at least some of the multiple pairs of flexures.

19. A vibration isolation system comprising:

a structure mount;

an equipment mount; and flexures and a mounting interface for coupling together the equipment mount to the structure mount;

wherein the flexures include multiple pairs of flexures;

wherein the mounting interface includes multiple interface parts movable relative to one another; and wherein a portion of one of the interface parts passes through another of the interface parts, allowing relative movement between the one of the interface parts and the another of the interface parts, and without contact between the one of the interface parts and the another of the interface parts.

20. The system of claim 19, wherein the interface parts include:
- a first interface part that includes a pair of first part side panels, and a pair of center beams that connect the side panels together;
- a second interface part that includes a pair of second part side panels and a central span connecting the second part side panels; and
- a third interface part that is a frame that surrounds and defines an opening.

* * * * *